April 29, 1930.  G. I. GREEN  1,756,460
COFFEE STEEPER
Filed Sept. 23, 1929
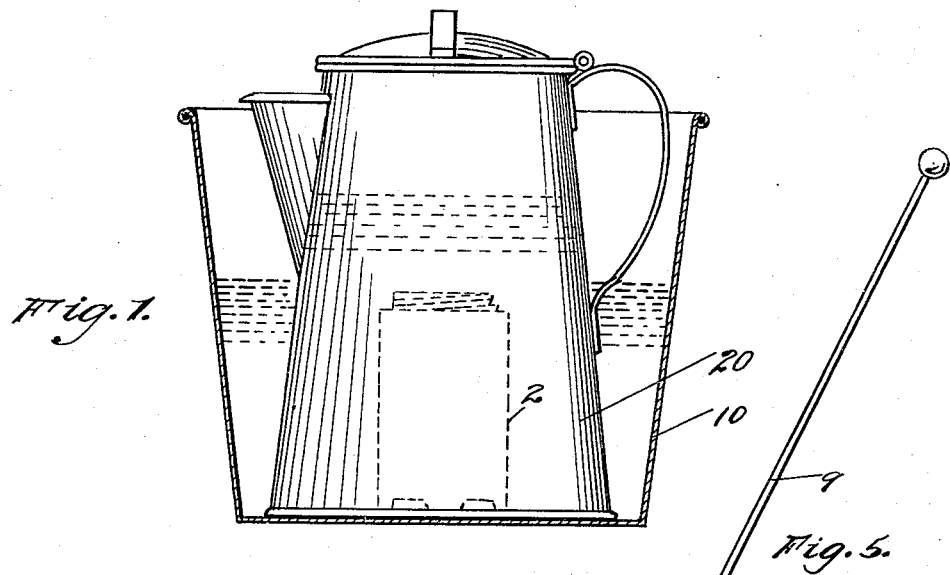
Fig. 1.
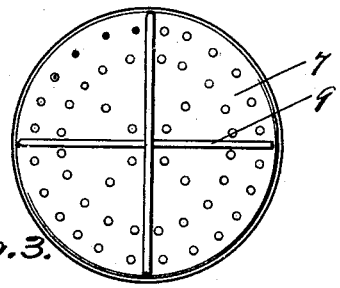
Fig. 3.
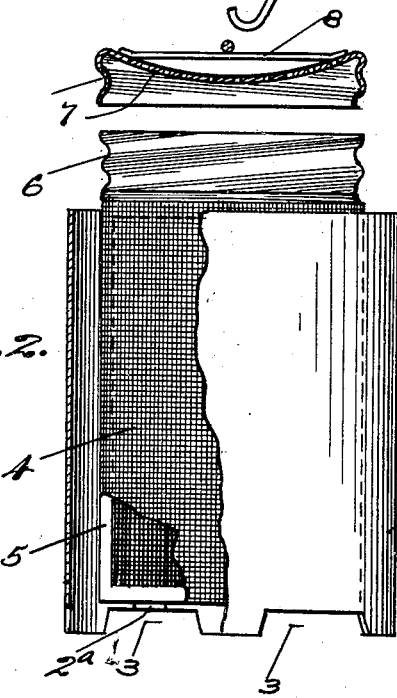
Fig. 5.
Fig. 2.
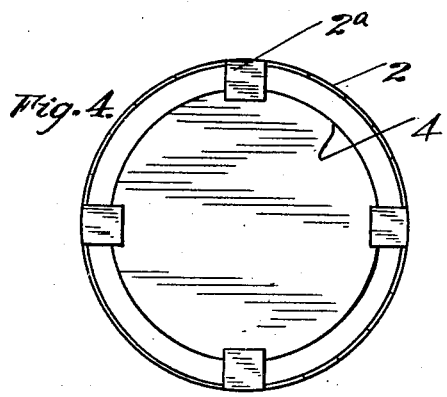
Fig. 4.
INVENTOR,
Geo. I. Green;
BY
ATTORNEY.

Patented Apr. 29, 1930

1,756,460

UNITED STATES PATENT OFFICE

GEORGE I. GREEN, OF LOS ANGELES, CALIFORNIA

COFFEE STEEPER

Application filed September 23, 1929. Serial No. 394,598.

This invention relates to cooking utensils and especially to apparatus for steeping coffee.

It is well known that there is a loss of aromatic flavor when coffee is subjected to boiling water and an object of this invention is to provide a low cost device whereby coffee may be steeped in water just under boiling degree so that the aroma will be preserved instead of driven off as by percolation and simple coffee pot treatment.

Other objects, advantages and features of construction, combination and details of parts and of the method will be made manifest in the ensuing description of the herewith illustrative embodiment, it being understood that modifications, variations and adaptations may be resorted to within the spirit, scope and principle of the invention as it is more directly claimed hereinafter, and consisting of the disclosure and its substantial equivalents.

Figure 1 is an axial section elevation of apparatus for steeping coffee.

Figure 2 is a sectional elevation of the coffee steeping container or steeper; its cover being detached.

Figure 3 is a plan of the cover.

Figure 4 is a bottom plan of the inverted steeper.

Figure 5 is a side view of the canfishing tool.

The coffee container, herein referred to as the steeper, consists of an outer shell or jacket 2 whose base edge is scalloped or apertured to provide opening 3 for the inflow of water when the base rests on the bottom of a coffee pot 20 containing a suitable amount of water.

The shell 2 is spaced from an inner receiver having a foraminous wall 4 which is here shown as fixed on a skeleton 5 which has a top rim 6 onto which may be screwed or otherwise attached a perforated cover 7. This cover is preferably dished downward and has bridge-bars 8 to be grappled by a hooked fishing tool 9 for facility of withdrawal of the steeper from the coffee pot 20.

The bottom of the container 4 is sufficiently above the edge of the base of the shell to insure a free circulation of water but is imperforate so that no water passes up into the container, and is confined to flow up between the shell and the container and out freely at the unrestricted, open top end of the shell space. This upward convection current acts inductively to draw liquor from the immersed container and this liquor replaced by static liquid pressure through the cover 7 so that in a reasonable time the flavor is extracted from the coffee fragments.

The steeper is solidly joined to the shell in any suitable manner, as by fixed cross lugs 2ª around the base of the shell.

In practice coffee is placed in the container 4 and this is closed by its cover 7 and is then placed in the coffee pot and covered with water. The pot is then placed in a convenient pan 10 and this is supplied with water not deep enough to enter the coffee pot.

The pan is then subjected to heat to boil the water therein and its heat is transmitted through the coffee pot to its water and this is caused to set up convection currents and ultimately absorb the coffee flavor without steaming off the aroma.

What is claimed is:

1. Apparatus, for steeping coffee, comprising, in combination, a coffee pot immersible in the pan, and a coffee steeper immersible in the pot and including an outer shell to rest on the bottom of the pot and which is spaced from and surrounds a foraminous receiver; said receiver having a concaved top with cross-bars for a fishing tool.

2. In a coffee steeping apparatus, a steeper adapted to be dropped to the bottom of a coffee pot to repose in upright position thereon said steeper including an inner receiver with an imperforate bottom and a perforate wall and a perforate cover to close in contents, and a jacket forming shell secured to and spaced around the receiver from bottom to top and forming a free upper outlet for convection currents thereabout; the shell being imperforate except for inflow opening in its base edge to permit inflow of water, and the receiver being secured to the shell in a position with its bottom elevated from the base line of the receiver; whereby during process the water is directed upward and confined in the jacket space to the top of the jacket and cannot escape laterally between the bottom and the top of the shell; thereby expediting the period of steeping.

GEORGE I. GREEN.